May 12, 1931. P. GARRIGUE 1,804,829
COLLAPSIBLE GLOBE AND MOUNTING FOR SAME
Filed June 30, 1928  2 Sheets-Sheet 2
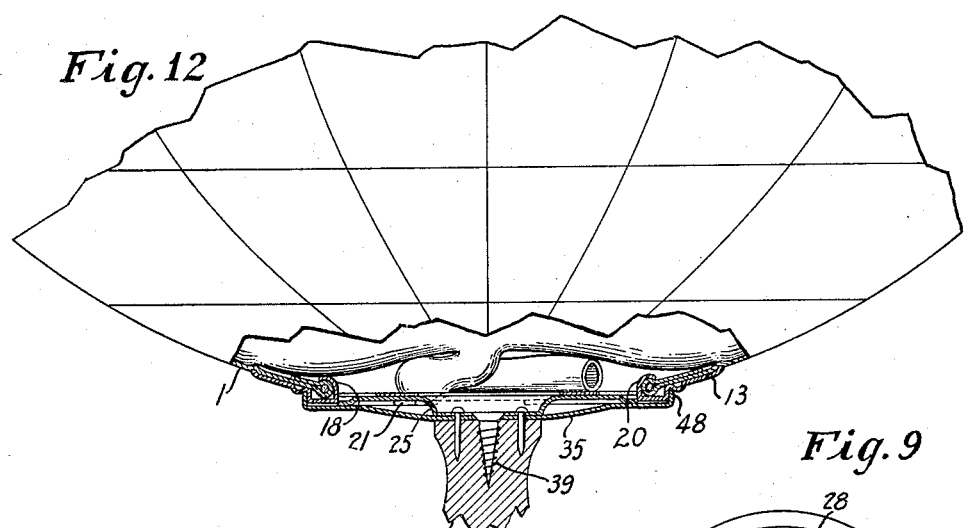
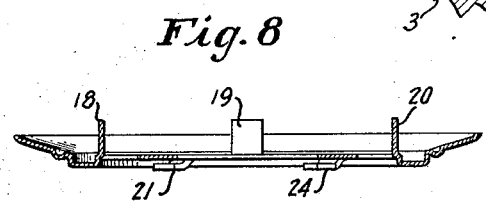
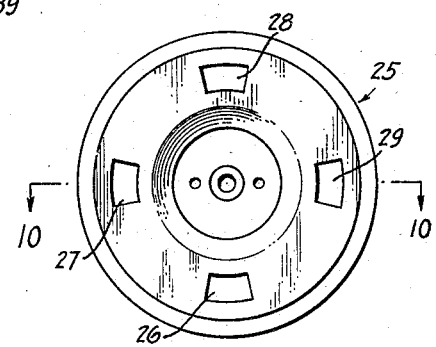
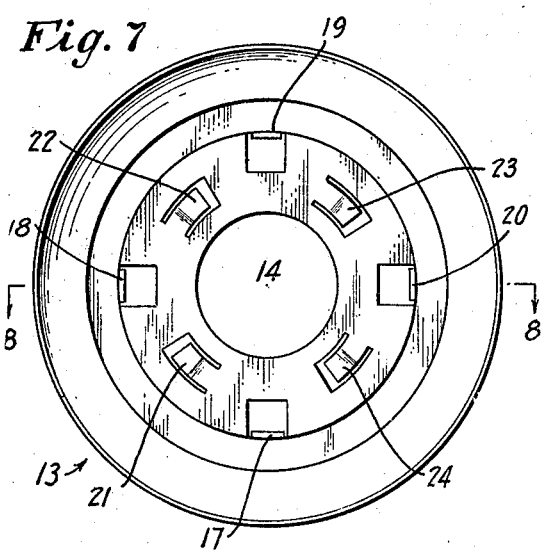
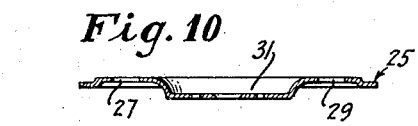
INVENTOR
PAUL GARRIGUE
BY
ATTORNEY Patented May 12, 1931

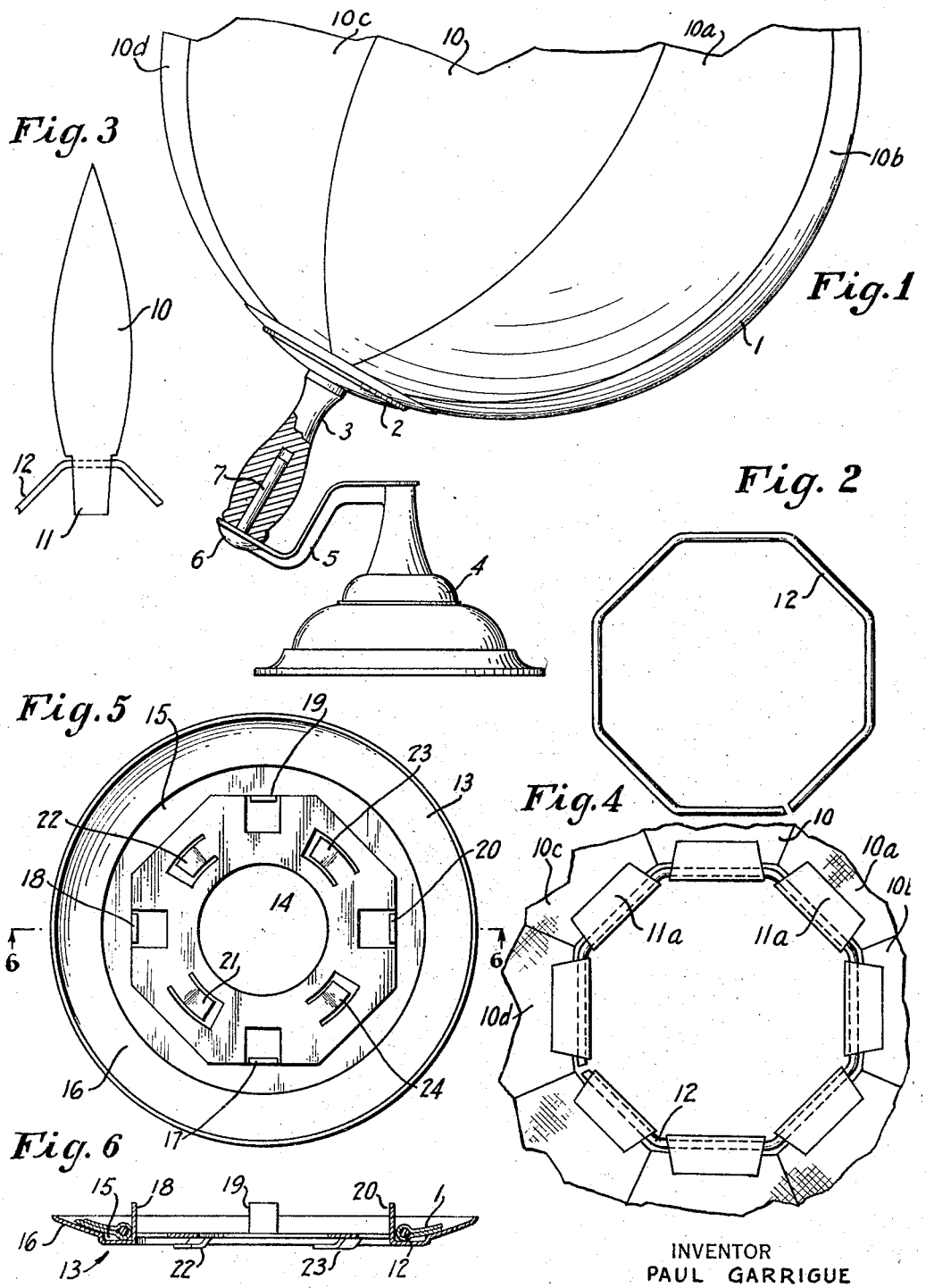

1,804,829

UNITED STATES PATENT OFFICE

PAUL GARRIGUE, OF NEW YORK, N. Y.

COLLAPSIBLE GLOBE AND MOUNTING FOR SAME

Application filed June 30, 1928. Serial No. 289,411.

This invention relates to a collapsible globe and more particularly to an inflatable globe which may carry on its exterior surface markings of the type usual in globes representing the world used for educational and other purposes, and is an improvement on the invention described and claimed in my copending application Serial Number 253,283, filed Feb. 10, 1928, entitled "Collapsible globe and method of producing same".

It is an object of this invention to provide a collapsible globe which shall be simple and rugged in construction, light in weight, neat and attractive in appearance, and which may be manufactured at a relatively low cost.

It is a further object of this invention to provide such a globe, which may be used either on a pedestal or removed therefrom and held in the hand, and which may be easily and quickly disassembled for packing or the insertion of a new bladder, and which may be easily and quickly assembled without the possibility of jamming or improper assembly.

Still other objects and advantages of my invention will be apparent from the specification.

The features of novelty which I believe to be characteristic of my invention are set forth with particularity in the appended claims. My invention itself, however, both as to its fundamental principles and as to its particular embodiments will best be understood by reference to the specification and accompanying drawings, in which:—

Figure 1 is an elevation, partly in section, of a completely assembled inflated globe according to my invention.

Figure 2 is a view of the anchoring ring for the envelope.

Figure 3 is a diagrammatic view, showing the relation of an envelope section to the anchoring ring.

Figure 4 is a diagrammatic view showing the anchoring ring with the envelope attached thereto.

Figure 5 is a plan view of one form of base plate.

Figure 6 is a section thereof on lines 6—6 of Figure 5.

Figure 7 is a plan view of a modified form of base plate.

Figure 8 is a section on lines 8—8 of Figure 7.

Figure 9 is a plan view of the mount.

Figure 10 is a section on lines 10—10 of Figure 9.

Figure 11 is a sectional view of the cover plate for the mount; and

Figure 12 is a sectional view of the assembled base plate and mount.

In the copending application above referred to, I have disclosed a collapsible globe having an envelope formed of a plurality of sections of fabric, preferably of petal-like shape, and secured together with their center lines converging to the opposite polar regions. The sections are provided at the south pole with tabs formed into loops, which encircle the anchoring ring. A base plate is provided for supporting the inflatable envelope and arranged to receive the anchoring ring, which is secured thereto, preferably by means of fingers associated with the base plate and bendable over the anchoring ring.

In accordance with the present invention, I utilize the features already described, together with certain improvements which will be described in detail.

Referring now more particularly to Figure 1, 1 designates generally the inflated envelope provided with a base plate and mount 2, and a handle 3 secured thereto. The handle 3 may be of any suitable material, such as wood, and is preferably provided with an axial hole in the bottom end thereof. A stand or base 4 is provided having an offset arm 5 terminating in a support plate 6, and carrying a rod-like projection 7. The handle forms a convenient means for grasping the globe in case it is desired to hold it in the hand or move it about for the purpose of demonstrating or lecturing. At the same time, the handle also forms a bearing upon which the globe may be rotated upon the stand.

Referring now more particularly to Figures 2, 3 and 4, the envelope is formed preferably of a plurality of petal-like sections 10, 10a, 10b, 10c and 10d: while the exact number of such sections is not of great importance, I prefer to utilize eight similar sections provided at one end with tabs 11. It is to be noted that the length of each section from the equator in the direction of the south pole is less than in the direction of the north pole, so that when the sections are secured together an opening will be left, through which the bladder may be inserted or removed. The tabs 11 have their ends turned over and stitched or riveted down, in a manner to form loops, 11a and the ring 12 is encircled by the loops of the various sections. The ring 12 may be split or may be solid, but I prefer to make it split for the convenience of assembly. If a solid ring is used, the tabs 11 will be bent over the ring and stitched or riveted whereas if a split ring is used, the loops will be formed when the fabric sections are assembled, and after assembly, the ring may be passed through the loops.

I also provide a base plate 13 having a central opening 14, through which access may be had to the bladder and having fingers 17, 18, 19 and 20, preferably stamped upward, as shown. An annular groove or trough 15 may also be provided to receive the anchoring ring, and in case the ring 12 is in the form of an octagon, the inner or outer or both walls of the trough 15 may be given a corresponding shape.

The base plate is also provided with a flange portion 16, following generally the contour of the globe and of sufficient area to provide a wide support. The base plate is also preferably provided with offset fingers 21, 22, 23 and 24 spaced downwardly, as shown.

In order to assemble the envelope to the base plate, after the anchoring ring has been secured to the envelope, it is only necessary to place the anchoring ring in the ring receiving space 15, as shown in Figure 6, after which the fingers 17, 18, 19 and 20, may be bent outwardly over the ring, securing it in position, as shown in Figure 12.

While a circular ring may be used, as described in my prior application above referred to, I prefer to utilize a ring in the form of a polygon having a side for each loop which encircles it, as the strain when the globe is inflated is more evenly distributed upon the tabs 11 than when a circular ring is used.

In general, the more pronounced the trough in the base plate which receives the ring, the lighter the ring may be: if the center or outer shoulders of the trough are made less pronounced, the ring will be made correspondingly stiffer, and in case the trough is omitted entirely, which may be done if desired, the base plate will take very little of the strain when the envelope is inflated, and the ring must be made relatively rigid to prevent stretching. In Figures 5 and 6, only the inner wall of trough 15 is octagonal in shape, the outer wall being circular.

Referring now more particularly to Figures 7 and 8, I have shown a modified form of base plate more particularly adapted to a circular ring.

Referring now more particularly to Figures 9 and 10, 25 designates generally the mount to which the base plate is attached. The mount comprises a disc having openings such as 26, 27, 28 and 29, adapted to be engaged by the fingers 21, 22, 23 and 24. The mount 25 is provided with a depressed center portion 31 carrying an opening for a screw 39 to be inserted into the handle 3, and also, if desired, with a plurality of smaller openings through which suitable nails may be driven to take the strain of rotating the mount by means of the handle which would otherwise tend to loosen the screw 39. Various other arrangements may be used for this purpose, if desired: for example, the handle may be notched, and the mount correspondingly notched for engagement therewith. If this is done, the nails may be omitted.

Referring now more particularly to Figure 11, 35 designates a cover plate following the general shape of the globe, and, if desired, having an upturned edge 48. The cover plate is positioned under the mount, as shown in Figure 12 and serves to conceal the interlocking means by which the base plate and mount are attached.

In assembling the globe, the envelope is made and secured to the anchoring ring, which is positioned in the base plate as already described. The mount and cover plate are preferably attached to the handle in the manner already described and as shown in Figure 12. The bladder may now be inserted in the envelope and inflated in the usual way. After the bladder is completely inflated and sealed, the mount may be attached to the base plate by placing the mount with the openings 26, 27, 28 and 29 over the fingers 21, 22, 23 and 24, after which, the mount is rotated slightly with respect to the base plate which causes the mount to be engaged between the fingers 21, 22, 23 and 24 and the base plate, the spring action of the fingers serving to resiliently retain the mount and base plate in interlocked position. In order to disengage the mount, it is only necessary to rotate the mount slightly in the opposite direction to free the openings from the fingers. A particular advantage of this construction, I have found, resides in the fact that it is practically impossible to assemble the device in any other manner than the correct manner, and when assembled, no joints are visible, the assembly presenting a smooth, and clean appearance.

While I prefer to provide the fingers 21, 22, 23 and 24 on the base plate and the corresponding holes in the mount, it will be understood that the fingers may be provided on the mount and the holes may be provided in the base plate.

Also, while I prefer to anchor the ring to the base plate by means of the fingers 17, 18, 19 and 20, the ring may be secured to the base plate by other means, such for example as by soldering or spot welding. In such construction, it is preferable to provide two or more bends in the ring to make contact with the base plate between the loops, at which points the ring and base plate will be soldered or welded.

It will be understood that the number and disposition of the fingers 17, 18, 19 and 20, and the fingers 21, 22, 23 and 24 may be changed, if desired; and also, the ring may be made in a plurality of sections, each section being individually secured to the base plate, and preferably, the base plate, mount and cover plate are so arranged as to be each capable of being stamped out in as few operations as possible from suitable material, such as brass, thin sheet steel, or the like.

While I have described certain preferred embodiments of my invention, it will be understood that modifications and changes may be made without departing from the spirit and scope thereof, as will be understood by those skilled in the art.

I claim:—

1. A support assembly for a collapsible globe having an envelope, said assembly comprising in combination, a base secured to said envelope, and a mount to which said base may be attached, said base and mount being provided within the periphery with interlocking means for detachably securing said base and mount together, said interlocking means being concealed when said plates are secured together.

2. A support assembly for a collapsible globe having an envelope, said assembly comprising in combination, a base secured to said envelope, and a mount for receiving said base, said base and mount being arranged to interlock within the periphery thereof.

3. A support assembly for a collapsible globe having an envelope, said assembly comprising in combination a base member secured to said envelope, and a mount member detachably secured to said base member, one of said members having fingers thereon within the periphery and the other having means for engaging and detachably retaining said fingers.

4. A support assembly for a collapsible globe having an envelope, said assembly comprising in combination, a base plate secured to said envelope, and a mounting plate arranged to receive said base plate, one of said plates being provided with fingers offset therefrom, and disposed within the periphery thereof and the other of said plates having openings to permit said fingers to pass therethrough.

5. A support assembly for a collapsible globe having an envelope, said assembly comprising in combination, a base plate, an anchoring ring secured to said envelope and to said base plate, and a mount for detachably receiving said base plate, said mount and said base plate being provided with interlocking means disposed within the periphery and concealed when said plate and mount are secured together.

6. A support assembly for a collapsible globe having an envelope, said assembly comprising in combination, a base plate, an anchoring ring secured to said envelope, ring-retaining means mounted on said base plate, a mounting plate arranged to receive said base plate, and arcuate fingers offset from one of said plates, and the other of said plates having openings arranged to receive said fingers.

7. A support assembly and a collapsible globe having an envelope, comprising in combination, an envelope having an opening, said envelope being formed of a plurality of petal-like sections, loops carried by said sections at said opening, and an anchoring ring encircled by said loops, said ring being in the form of a polygon having a side for each loop encircling it.

8. In a collapsible globe, an envelope, a base plate, a ring secured to said envelope and to said base plate, a mount detachably secured to said base plate, and a cover plate associated with said mount.

9. In a collapsible globe, an envlope, an anchoring ring insertable in said envlope, a base plate arranged to receive said ring, and means carried by said base plate for securing said ring in position on said base plate, said means comprising fingers integral with said base plate and bendable over said ring.

10. A support assembly for a collapsible globe having an envelope, said assembly comprising in combination, an anchoring ring insertable in said envelope, a base plate arranged to receive said ring, means carried by said base plate for securing said ring in position on said base plate, said means comprising integral fingers bendable over said ring, and means carried by said base plate for engaging a mount, said means comprising offset fingers disposed within said first named fingers.

Signed at New York city, in the county of New York and State of New York, this 22d day of June, A. D. 1928.

PAUL GARRIGUE.